(12) United States Patent
Wakayama (10) Patent No.: US 8,730,261 B2
(45) Date of Patent: May 20, 2014

(54) IMAGE PROCESSING DEVICE, IMAGE PROCESSING INTEGRATED CIRCUIT, IMAGE PROCESSING SYSTEM, INPUT ASSEMBLER DEVICE, AND INPUT ASSEMBLING INTEGRATED CIRCUIT

(75) Inventor: Yorihiko Wakayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1146 days.

(21) Appl. No.: 12/377,434

(22) PCT Filed: Sep. 4, 2007

(86) PCT No.: PCT/JP2007/067198
§ 371 (c)(1),
(2), (4) Date: Mar. 5, 2009

(87) PCT Pub. No.: WO2008/032603
PCT Pub. Date: Mar. 20, 2008

(65) Prior Publication Data
US 2010/0053150 A1    Mar. 4, 2010

(30) Foreign Application Priority Data

Sep. 13, 2006  (JP) .................................. 2006-247715

(51) Int. Cl.
*G09G 5/30*      (2006.01)
(52) U.S. Cl.
USPC ........................................................ 345/623
(58) Field of Classification Search
USPC ........................................................ 345/623
See application file for complete search history.

(56) References Cited

U.S. PATENT DOCUMENTS

| | | | | |
|---|---|---|---|---|
| 5,522,018 A * | 5/1996 | Takeda et al. | .................. | 345/422 |
| 5,559,937 A * | 9/1996 | Takeda | .......................... | 345/627 |
| 6,037,946 A * | 3/2000 | Takeda | .......................... | 345/422 |
| 6,317,813 B1 * | 11/2001 | Su et al. | ........................ | 711/158 |
| 6,580,429 B1 * | 6/2003 | Moriwaki et al. | ............. | 345/426 |
| 6,587,113 B1 * | 7/2003 | Baldwin et al. | ............... | 345/557 |

(Continued)

FOREIGN PATENT DOCUMENTS

| | | |
|---|---|---|
| JP | 2001-209369 | 8/2001 |
| JP | 2002-15337 | 1/2002 |
| JP | 2005-275798 | 10/2005 |
| WO | 95/09405 | 4/1995 |

OTHER PUBLICATIONS

International Search Report issued Oct. 2, 2007 in the International (PCT) Application of which the present application is the U.S. National Stage.

*Primary Examiner* — Javid A Amini
(74) *Attorney, Agent, or Firm* — Wenderoth, Lind & Ponack, L.L.P.

(57) ABSTRACT

A coordinate data read unit reads coordinate data of vertexes of a three-dimensional object stored in a memory into an internal storage unit. A coordinate transformation unit performs coordinate transformation on the coordinate data stored in the internal storage unit. A vertex deletion unit determines whether a piece of the attribute data of each vertex is to be read, based on the transformed pieces of the coordinate data stored in the internal storage unit. An attribute data read unit reads a piece of the attribute data of each vertex determined to be read by the vertex read unit from the memory into the internal storage unit. A display control unit performs drawing processing based on the pieces of the coordinate and the attribute data stored in the internal storage unit.

9 Claims, 7 Drawing Sheets

(56) References Cited

U.S. PATENT DOCUMENTS

| | | | |
|---|---|---|---|
| 6,597,363 B1* | 7/2003 | Duluk et al. | 345/506 |
| 8,035,636 B1* | 10/2011 | Yang | 345/419 |
| 2001/0019427 A1* | 9/2001 | Komatsu | 358/1.18 |
| 2002/0159627 A1* | 10/2002 | Schneiderman et al. | 382/154 |
| 2004/0073446 A1* | 4/2004 | Snow | 705/1 |
| 2004/0217956 A1* | 11/2004 | Besl et al. | 345/419 |
| 2005/0007385 A1* | 1/2005 | Aoyama | 345/632 |
| 2007/0146197 A1* | 6/2007 | Wimmer | 342/185 |
| 2007/0265105 A1* | 11/2007 | Barton et al. | 473/220 |
| 2007/0268298 A1* | 11/2007 | Alben et al. | 345/530 |
| 2008/0001960 A1* | 1/2008 | Chen | 345/582 |
| 2010/0053150 A1* | 3/2010 | Wakayama | 345/419 |
| 2010/0201695 A1* | 8/2010 | Hill et al. | 345/503 |

* cited by examiner

VIEW VOLUME

FIG. 3

| | |
|---|---|
| 311 | X COORDINATE VALUE OF VERTEX 1 |
| 312 | Y COORDINATE VALUE OF VERTEX 1 |
| 313 | Z COORDINATE VALUE OF VERTEX 1 |
| | X COORDINATE VALUE OF VERTEX 2 |
| | Y COORDINATE VALUE OF VERTEX 2 |
| | Z COORDINATE VALUE OF VERTEX 2 |
| | X COORDINATE VALUE OF VERTEX 3 |
| | Y COORDINATE VALUE OF VERTEX 3 |
| | Z COORDINATE VALUE OF VERTEX 3 |
| | X COORDINATE VALUE OF VERTEX 4 |
| | Y COORDINATE VALUE OF VERTEX 4 |
| | Z COORDINATE VALUE OF VERTEX 4 |

IMAGE PROCESSING DEVICE, IMAGE PROCESSING INTEGRATED CIRCUIT, IMAGE PROCESSING SYSTEM, INPUT ASSEMBLER DEVICE, AND INPUT ASSEMBLING INTEGRATED CIRCUIT

TECHNICAL FIELD

The present invention relates to computer graphics, particularly to an image processing technique including clipping for displaying an object.

BACKGROUND ART

In general, an image processing device that performs image processing for displaying an object on a display is provided with a special processor (hereinafter, referred to as "graphic accelerator") in addition to a main processor that performs control on the entire image processing device and the like. When this graphic accelerator performs image processing, such as drawing processing of an object, image processing can be realized at a higher speed than when the main processor performs the image processing.

Figure 9:
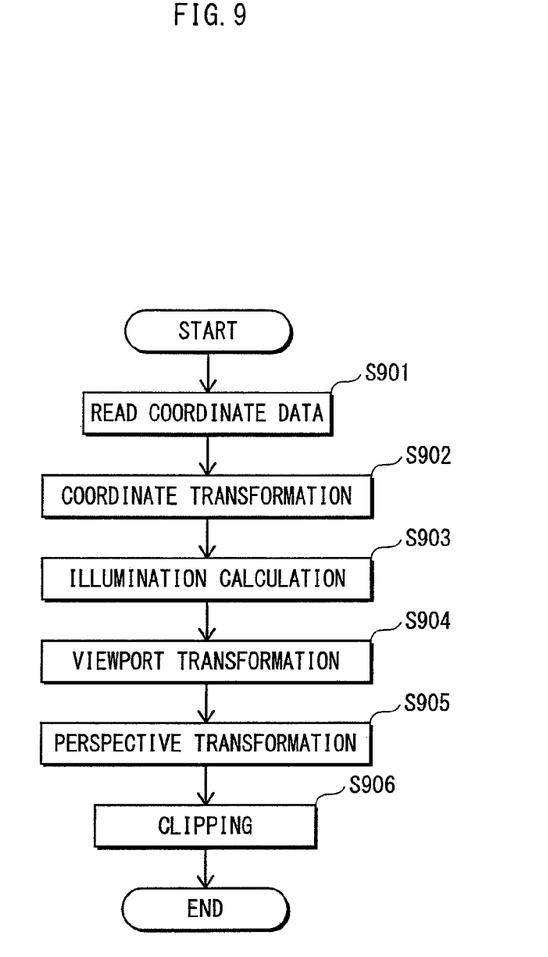
FIG. 9 is a flowchart to show conventional image processing including clipping.

The image processing by the graphic accelerator includes processing called clipping for displaying only a part of an object included in a designated part of a display area on the display (e.g. see Patent Document 1) The following is a description of a flow of general image processing including this clipping performed by the graphic accelerator, with the reference to FIG. 9.

As shown in FIG. 9, the graphic accelerator reads, from a memory, coordinate values of each vertex of an object expressed in a local coordinate system (Step S901). The graphic accelerator performs coordinate transformation that converts each of the read coordinate values to be expressed in a world coordinate system (Step S902). The graphic accelerator reads, from memory, data piece of each vertex, such as a color (R, G, B), a transmittance (α), a texture coordinate (U, V) (hereinafter, these pieces of data are collectively referred to as "attribute data"), and performs illumination calculation based on the read attribute data piece of each vertex and each coordinate value expressed in the world coordinate system (Step S903). Subsequently, the graphic accelerator performs viewport transformation which is coordinate transformation that converts from the world coordinate system into a viewing coordinate system (Step S904), and performs perspective transformation which is coordinate transformation that converts from the viewing coordinate system into a display coordinate system (Step S905). Lastly, the graphic accelerator performs clipping to delete part of data protruding from the display area (S906).

[Patent Document 1] Japanese Unexamined Patent Application Publication No. 2001-209369

DISCLOSURE OF THE INVENTION

Problems the Invention is Attempting to Solve

However, in recent years, there has been demand for display of more complicated objects, as manifested by graphics of games and such. Accordingly, image processing performed at even higher speed is demanded.

The present invention is conceived in view of the above problem, and aims to provide an image processing device capable of performing image processing at a higher speed.

Means for Solving the Problems

To solve the above problem, the present invention provides an image processing device for displaying, in a predetermined display area, an object containing a plurality of points based on object data with use of computer graphics, the object data including coordinate data and attribute data both defining the points, the image processing device including an internal storage unit, a coordinate data read unit operable to read a piece of the coordinate data of each point from the external memory into the internal storage unit, a determination unit operable to determine, for each point, whether a piece of the attribute data of the point needs to be read, the determination being made at least based on whether coordinates of the point are included in a predetermined display coordinate range that defines a range of the coordinates to be displayed in the predetermined display area, an attribute data read unit operable, (i) to read, into the internal storage unit, a piece of the attribute data of each point determined by the determination unit to be read, and (ii) not to read a piece of the attribute data of each point determined by the determination unit not to be read, and a display control unit operable to have at least part of the object displayed in the display area, based on the pieces of the coordinate and attribute data stored in the internal storage unit.

In addition, to solve the above problem, the present invention provides an image processing integrated circuit for displaying, in a predetermined display area, an object containing a plurality of points based on object data with use of computer graphics, the object data including coordinate data and attribute data both defining the points, the image processing integrated circuit including an internal storage unit, a coordinate data read unit operable to read a piece of the coordinate data of each point from the external memory into the internal storage unit, a determination unit operable to determine, for each point, whether apiece of the attribute data of the point needs to be read, the determination being made at least based on whether coordinates of the point are included in a predetermined display coordinate range that defines a range of the coordinates to be displayed in the predetermined display area, an attribute data read unit operable, (i) to read, into the internal storage unit, apiece of the attribute data of each point determined by the determination unit to be read, and (ii) not to read a piece of the attribute data of each point determined by the determination unit not to be read, and a display control unit operable to have at least part of the object displayed in the display area, based on the pieces of the coordinate and attribute data stored in the internal storage unit.

In addition, to solve the above problem, the present invention provides an input assembler device used in an image processing device for displaying, in a predetermined display area, an object containing a plurality of points based on object data with use of computer graphics, the object data including coordinate data and attribute data both defining the points, the input assembler device including an internal storage unit, a coordinate data read unit operable to read a piece of the coordinate data of each point from the external memory into the internal storage unit, a determination unit operable to determine, for each point, whether a piece of the attribute data of the point needs to be read, the determination being made at least based on whether coordinates of the point are included in a predetermined display coordinate range that defines a range of the coordinates to be displayed in the predetermined display area, an attribute data read unit operable, (i) to read, into the internal storage unit, a piece of the attribute data of each point determined by the determination unit to be read, and (ii) not to read a piece of the attribute data of each point determined by the determination unit not to be read, and a display control unit operable to have at least part of the object displayed in the display area, based on the pieces of the coordinate and attribute data stored in the internal storage unit.

In addition, to solve the above problem, the present invention provides an input assembling integrated circuit used in an image processing device for displaying, in a predetermined display area, an object containing a plurality of points based on object data with use of computer graphics, the object data including coordinate data and attribute data both defining the points, the input assembling integrated circuit including an internal storage unit, a coordinate data read unit operable to read a piece of the coordinate data of each point from the external memory into the internal storage unit, a determination unit operable to determine, for each point, whether a piece of the attribute data of the point needs to be read, the determination being made at least based on whether coordinates of the point are included in a predetermined display coordinate range that defines a range of the coordinates to be displayed in the predetermined display area, an attribute data read unit operable, (i) to read, into the internal storage unit, a piece of the attribute data of each point determined by the determination unit to be read, and (ii) not to read a piece of the attribute data of each point determined by the determination unit not to be read; and a display control unit operable to have at least part of the object displayed in the display area, based on the pieces of the coordinate and attribute data stored in the internal storage unit.

Herein, a piece of the attribute data is data for representing a color and a pattern of each vertex. Examples of such a data piece include a color data piece expressing light three primary colors of Red, Green and Blue, a transmittance data piece showing a level of light transmitted from a light source, and a texture coordinate data piece which is a coordinate value on a texture expressed in a coordinate system peculiar to a two dimension when the texture is pasted to a surface of the object. The operation is performed based on a piece of the attribute data of each vertex, and hence a color and a pattern of an entire object are determined.

Effects of the Invention

According to the image processing device, the integrated circuit for image processing, the input assembler device, and the input assembling integrated circuit pertaining to the present invention each having the above features, the attribute data read unit does not read a piece of the attribute data of each point that is determined, by the determination unit, not to require being read. Therefore, according to each device and circuit pertaining to the present invention, when there are some of the points of the object whose pieces of the attribute data are determined not to require being read, the traffic amount transmitted from the external memory to the internal storage unit can be cut, and thus higher-speed image processing can be performed.

For example, when it is supposed that an object is composed of a plurality of polygons, that points are vertexes of the polygons, and that the determination unit determines that it is necessary to read a piece of the attribute data of each vertex that is included in a display coordinate range and unnecessary to read a piece of the attribute data of each vertex that is out of the display coordinate range, the display control unit has a polygon of which some of the vertexes are included in the display coordinate range displayed, based on the pieces of the coordinate data of the vertexes of the polygon and the pieces of the attribute data of only the vertexes that are included in the display coordinate range, both stored in the internal storage unit. Therefore, compared with a case where pieces of the attribute data of all the vertexes of the polygon are read, the accuracy of an image of the polygon is a little lower. Accordingly, the present invention is particularly effective when the device or the integration circuit of the present invention is applied to a device or integration circuit having the following specification. It is sufficient to draw accurately a polygon of which all the vertexes are included in the display coordinate range, and high-speed image processing is required.

In addition, the object is composed of one or more polygons. The points are vertexes contained in each polygon. A piece of the coordinate data of each vertex is so structured as to identify other vertexes of the polygon which includes the vertex. The determination unit determines, for each vertex, that a piece of the attribute data of the vertex does not need to be read if the polygon defined by the vertex and the other vertexes is entirely out of the display coordinate range. The display control unit has at least part of each polygon displayed in the display area, based on the pieces of the coordinate and attribute data stored in the internal storage unit.

According to the above feature, with regard to each vertex, when a polygon defined by the vertex and other vertexes is not included in the display coordinate range, the determination unit determines it is unnecessary to read a piece of the attribute data of the vertex. Therefore, the image processing device can reduce traffic amount, transmitted from the external memory to the internal storage unit, of the piece of the attribute data of the vertex included only in the polygon that is entirely out of the display coordinate range. Thus, the image processing device can perform image processing at a higher speed.

In addition, even if coordinates shown by a piece of the coordinate data of a vertex are not included in the display coordinate range, when part of a polygon defined by the vertex and other vertexes is included in the display coordinate range, the determination unit determines that the piece of the attribute data of the vertex needs to be read. Therefore, when some of the vertexes of the polygon are included in the display coordinate range, the display control unit can also have part of the polygon accurately displayed, based on the pieces of the coordinate data of all the vertexes of the polygon and the pieces of the attribute data.

In addition, the image processing device may further include a coordinate transformation unit operable (i) to perform coordinate transformation on each piece of the coordinate data read into the internal storage unit by the coordinate data read unit so that coordinates of each piece of the coordinate data are expressed in a world coordinate system, and (ii) to read each transformed piece of the coordinate data into the internal storage unit. The object is a three-dimensional object, and the display coordinate range is a view volume. The determination unit may determine, for each vertex, that a piece of the attribute data of the vertex does not need to be read if the polygon defined by the vertex and other vertexes is entirely out of the view volume, the determination being made based on each transformed piece of the coordinate data. The display control unit may have at least part of each polygon displayed in the display area, based on the transformed pieces of the coordinate data and the pieces of the attribute data stored in the internal storage unit.

Herein, the view volume means a space corresponding to a field of vision seen from a given viewpoint, and the detail thereof is later described.

Accordingly, for example, when each piece of the coordinate data is expressed in the local coordinate system, the coordinate transformation unit performs coordinate transformation on each piece of the coordinate data to be converted into the world coordinate system. Based on the transformed piece of the coordinate data, the determination unit determines, for each vertex, that it is unnecessary to read a piece of the attribute data of each vertex when a polygon defined by the vertex and other vertexes is not included in the view volume. Hence, the image processing device can perform image processing at a higher speed because of cut in traffic amount, transmitted from the external memory to the internal storage unit, of a piece of the attribute data of each vertex included only in the polygon that is entirely out of the view volume.

In addition, pieces of the coordinate data composing the object data may be contiguously stored in the external memory.

According to this feature, since pieces of the coordinate data are contiguously stored in the external memory, the coordinate data read unit can continuously read each piece of the coordinate data from the external memory into the internal storage unit. Compared with the noncontiguously-stored pieces of the coordinate data, the contiguously-stored data pieces can be read at higher speed. Thus, the image processing device can realize higher-speed image processing.

Each piece of the attribute data may include color data.

According to this feature, the attribute data read unit does not read a piece of the attribute data that includes color data of a vertex that is determined reading thereof is unnecessary. Accordingly, when some points of the object is determined, by the determination unit, not to require being read, the image processing device can perform image processing at a higher speed because of the cut in traffic amount, from the external memory to the internal storage unit, of the pieces of the attribute data including the color data.

In addition, an image processing system in accordance with the present invention has an image processing device and a control device. The control device contiguously stores, in an external memory, pieces of coordinate data each defining one of a plurality of points of an object.

According to this feature, since the control device contiguously stores, in an external memory, pieces of the coordinate data each defining one of the plurality of points, the coordinate data read unit of the image processing device can continuously read each piece of the coordinate data from the external memory into the internal storage unit. Hence, compared with noncontiguously-stored pieces of the coordinate data, the contiguously-stored data pieces can be read at higher speed. Thus, the image processing device can realize higher-speed image processing.

REFERENCE NUMERALS 100 image processing device
101 input assembler unit
102 coordinate data read unit
103 coordinate transformation unit
104 vertex deletion unit
105 attribute data read unit
106 internal storage unit
107 display control unit
110 memory
120 control device
130 display device

BEST MODE FOR CARRYING OUT THE INVENTION

The following describes an embodiment of the present invention, with the reference to the attached figures.
<Outline>

An image processing device pertaining to the embodiment can realize high-speed processing for displaying a three-dimensional object composed of a plurality of polygons by suppressing the number of times of reading of attribute data. More specifically, the image processing device performs the processing as provided below, based on an instruction from a control device commanding the image processing device to perform image processing for displaying a three-dimensional object. Note that hereinafter simply a polygon means a triangle polygon.

The image processing device reads a piece of the coordinate data of each vertex of polygons composing the three-dimensional object from a memory into an internal storage area within the device. The image processing device performs coordinate transformation on the read piece of coordinate data of each vertex. In addition, based on the piece of the coordinate data of each vertex on which coordinate transformation is performed, it is determined whether apiece of the attribute data of each vertex needs to be read.

More specifically, with respect to each vertex, when at least a part of a polygon including the vertex is included in a view volume, it is determined that the piece of the attribute data of the vertex needs to be read. That is to say, when no part of the polygon including the vertex is included in the view volume, it is determined that the piece of the attribute data of the vertex does not need to be read.

According to results of the determination, the image processing device reads only an attribute data piece of each vertex that is determined to require being read from the memory into the storage area within the device. Based on the pieces of the coordinate data and the pieces of the attribute data stored in the storage area, at least part of the three-dimensional object is drawn.

Thus, with regard to each vertex, when no part of the polygon including the vertex is included in the view volume, the image processing device does not read the piece of the attribute data of the vertex from the memory. Accordingly, in a case where there is a vertex determined not to require being read, compared with a case where the pieces of the attribute data of all the vertexes of the three-dimensional object are unconditionally read, the image processing device suppresses the number of reading times of the pieces of the attribute data from the memory so that processing time to read the pieces of the attribute data can be reduced. Thus, the image processing device can realize high-speed image processing.

The above-mentioned control device stores the coordinate data and the attribute data of the vertexes of the polygons composing the three-dimensional object. For example, when the control device stores, in sequence, the coordinate data and the attribute data of the three-dimensional object in the memory, more frequently the image processing device reads the attribute data, the more memory access conflicts occur between the control device and the image processing device. Hence, delay in access to the memory may be occurred in each of the control device and the image processing device. Described as above, since the image processing device can suppress the number of reading times of the attribute data from the memory, the access delay occurred as a result of the memory access conflict with the control device can be reduced. Thus, the slow-down of the processing speed of each of the control device and the image processing device can be avoided.

<Structure>

The following describes a structure of the image processing device in accordance with the embodiment.

Figure 1:
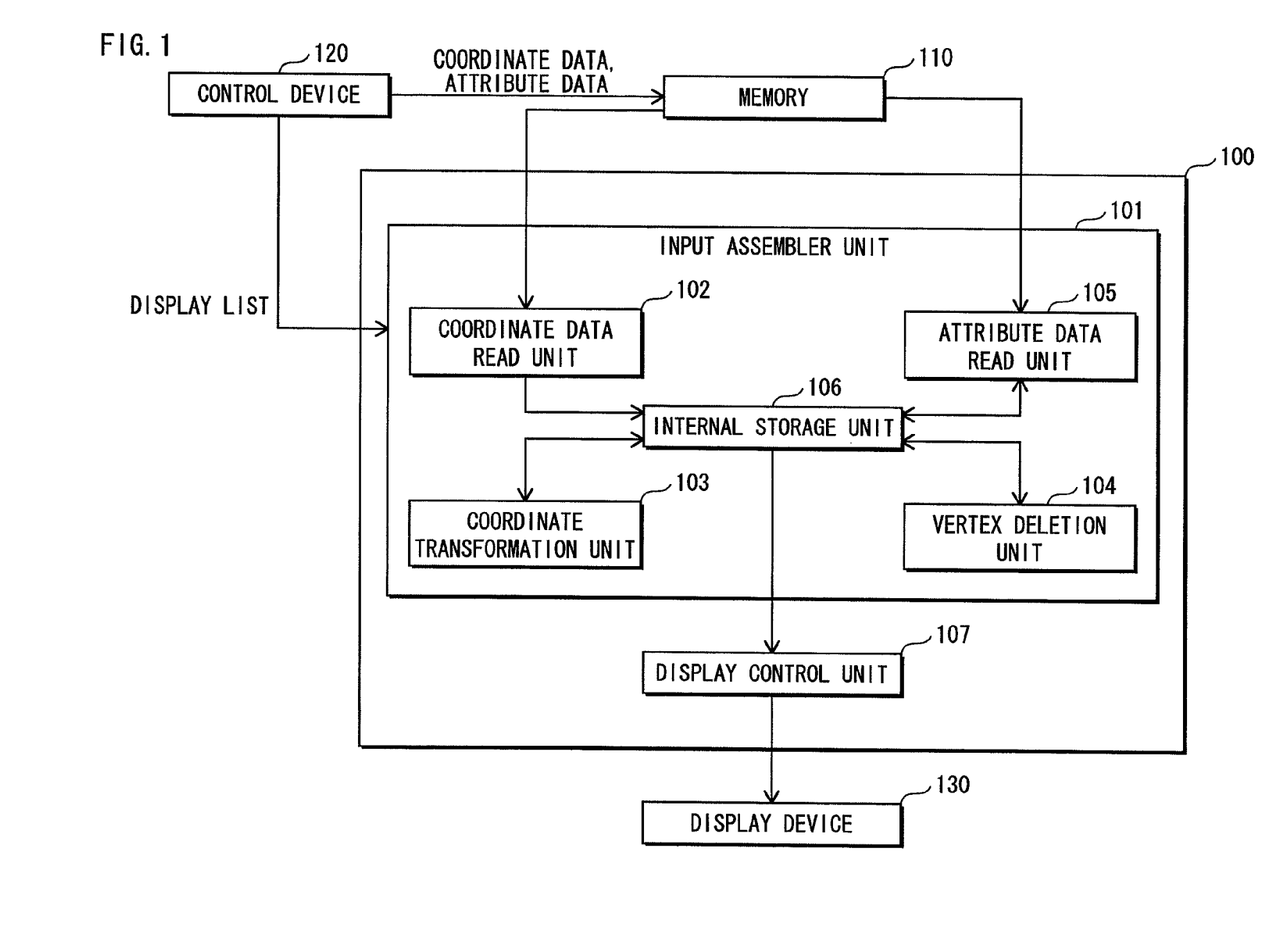
FIG. 1 is a functional diagram of an image processing device 100, according to an embodiment of the present invention.

FIG. 1 is a function block diagram of an image processing device 100 in accordance with the embodiment.

The image processing device 100 includes a circuit block that structures an integrated circuit that is so-called a graphic accelerator. The image processing device 110 is connected to a memory 110, a control device 120 and a display device 130 via a signal line group, namely a bus. The image processing device 100, the memory 110, the control device 120, the display device 130, an input device such as a keyboard (unillustrated) and a storage device such as a hard disk (unillustrated) constitute so-called a computer.

The following briefly describes elements connected by the image processing device 100.

The memory 110 is a memory that stores therein the coordinate data and the attribute data of the vertexes of the polygons composing the three-dimensional object. The control device 120 controls pieces of the coordinate data of the vertexes to be stored contiguously to each other and pieces of the attribute data of the vertexes also to be stored contiguously to each other. Note that the piece of the coordinate data is data showing coordinate values of each vertex in a local coordinate system. The local coordinate system is a coordinate system which is defined for every object and in which the center of the object is generally defined as the origin thereof. A piece of the attribute data is data showing a color and such of each vertex. The coordinate data and the attribute data are described later.

The control device 120 is a circuit block (main processor) that transmits, to the image processing device 100, a display list including a top address value and such of the storage area of each piece of the coordinate data and the attribute data on the memory 110 so that the image processing device 100 has the three-dimensional object displayed based on the display list.

More specifically, in order to change (change of shapes, colors and such) or generate the three-dimensional object to be displayed, according to user's input, a change in time, or other events, the control device 120 generates one-by-one a display list that defines a structure of the three-dimensional object to be displayed. The control device 120 transmits the generated display list to the image processing device 100, and stores, in the memory 110, the coordinate data and the attribute data of the vertexes of the polygons composing the three-dimensional object to be displayed.

The display device 130 is a display device, such as a display, on which the image processing device 100 has a three-dimensional object and the like displayed.

In addition, as shown in FIG. 1, the image processing device 100 includes an input assembler unit 101 and a display control unit 107. The following describes elements of the image processing device 100.

Based on the display list received from the control device 120, the input assembler unit 101 reads, into an internal storage area, the coordinate data of the vertexes of the polygons composing the three-dimensional object, and the attribute data of the vertexes of the polygons at least part of which is included in the view volume.

The input assembler unit 101 includes a coordinate data read unit 102, a coordinate transformation unit 103, a vertex deletion unit 104, an attribute data read unit 105, and an internal storage unit 106. The graphic accelerator's execution of a program stored in the internal storage unit 106 implements each function of the coordinate data read unit 102, the coordinate transformation unit 103, the vertex deletion unit 104, and the attribute data read unit 105. Note that the determination unit according to the present invention is equivalent to the vertex deletion unit 104.

Based on the top address value of the storage area of each piece of the coordinate data on the memory 110 included in the display list, the coordinate data read unit 102 reads the coordinate data of the vertexes of the polygons composing the three-dimensional object from the memory 110 into the internal storage unit 106.

The coordinate transformation unit 103 performs matrix operation to perform coordinate transformation on a piece of the coordinate data of each vertex expressed in a local coordinate system, stored by the coordinate data read unit 102 into the internal storage unit 106, to be expressed in the world coordinate system which is a coordinate system that expresses each piece of the coordinate data in a three-dimensional space where a three-dimensional object is arranged. The coordinate transformation unit 103 stores the transformed piece of the coordinate data of each vertex into the internal storage unit 106. Note that the coordinate transformation unit 103 performs the operation with the use of resister (unillustrated) that stores therein data of transformation matrix for performing the coordinate transformation into the world coordinate system.

The vertex deletion unit 104 determines whether a piece of the attribute data of each vertex needs to be read according to the transformed piece of the coordinate data of each vertex stored in the internal storage unit 106 by the coordinate transformation unit 103. Subsequently, the vertex deletion unit 104 stores the determination result of each vertex into the internal storage unit 106.

More specifically, the determination is performed as follows. When part of the polygon having the vertex is included in the view volume, it is determined that the piece of the attribute data of the vertex needs to be read. When no part of the polygon having the vertex is included in the view volume, it is determined that the piece of the attribute data of the vertex does not need to be read.

Figure 2:
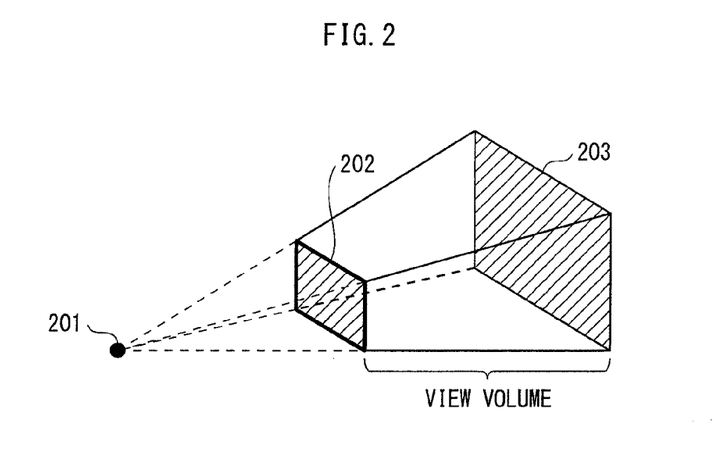
FIG. 2 is a view to explain a view volume, according to the embodiment.

The view volume is what defines a space corresponding to a field of vision in the world coordinate system. As shown in FIG. 2, a given viewing direction with reference to a viewpoint 201 is defined as the central axis of the view volume, and the view volume is a square-pyramid shaped space that is a spread angle defined as a given view angle, and the square pyramid shape is screened by a forward clip surface 202 and a backward clip surface 203. Since the view volume is defined as a space screened by the forward clip surface 202 and the backward clip surface 203, a polygon located too close from the viewpoint or too far away from the viewpoint is not displayed. Thus, processing pertaining to drawing can be performed at a high speed.

Note that since the method to determine whether the polygon is included in the view volume belongs to a prior art, the detail thereof is omitted. However, for example, according to whether coordinates of each vertex are included in the view volume, it can be determined whether all or some of the vertexes of the polygon are included in the view volume. In addition, by figuring out whether surfaces including the forward clip surface 202 and the backward clip surface 203 composing the view volume intersect the polygon, it can be determined whether the view volume includes part of the polygon that does not include the vertex.

Based on the determination result of each vertex stored, by the vertex deletion unit 104, in the internal storage unit 106 and the top address value of the storage area of each piece of the attribute data on the memory 110 included in the display list, the attribute data read unit 105 reads, from the memory 110 into the internal storage unit 106, piece of the attribute data of each vertex that is determined, by the vertex deletion unit 104, to require being read.

The internal storage unit 106 is a RAM (Random Access Memory) that stores the pieces of the coordinate data and the pieces of the attribute data read from the memory 110, the transformed pieces of the coordinate data, and the determination results by the vertex deletion unit 104.

Based on the determination results stored in the internal storage unit 106 of the input assembler unit 101, with the use of the transformed pieces of the coordinate data and the pieces of the attribute data stored in the internal storage unit 106, the display control unit 107 performs drawing processing for displaying the three-dimensional object on the display device 130. The drawing processing is performed in accordance with a hereinafter-described drawing command (e.g. a command to draw a triangle etc.) included in the display list. Since the drawing processing method according to the drawing command belongs to a prior art, an explanation thereof is omitted.

<Data>

The following describes each data piece used by the input assembler unit 101.

<Coordinate Data>

Firstly, a description is made on a piece of the coordinate data of each vertex stored in the memory 110.

Figure 3:
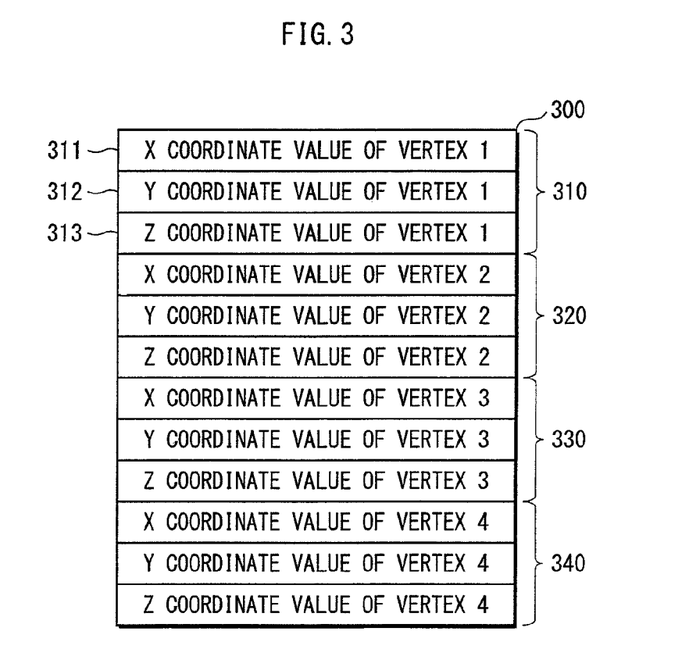
FIG. 3 is a view to show a data structure of coordinate data 300 and a content example thereof.

FIG. 3 is a view showing attribute data 300 and a content example thereof.

The coordinate data 300 is data defining vertexes of polygons constituting a three-dimensional object expressed in a local coordinate system. FIG. 3 shows an example as follows. When the polygons composing the three-dimensional object include vertexes 1-4, the coordinate data 300 is composed of a piece of the coordinate data 310 defining the vertex 1, a piece of the coordinate data 320 defining the vertex 2, a piece of the coordinate data 330 defining the vertex 3, and a piece of the coordinate data 340 defining the vertex 4.

The pieces of the coordinate data of the vertexes are contiguously stored in a contiguous area on the memory 110. This storing order can identify the vertexes of each of the polygons composing the three-dimensional object. That is to say, FIG. 3 shows that the vertexes 1-3 compose one polygon and that the vertexes 2-4 compose another polygon.

The piece of the coordinate data 310 of the vertex 1 is data showing three-dimensional coordinate values of the vertex 1. The piece of the coordinate data 310 is made up from an X coordinate value 311 of the vertex 1, a Y coordinate value 312 of the vertex 1, and a Z coordinate value 313 of the vertex 1. These three-dimensional coordinate values are contiguously stored in the contiguous area on the memory 110. Note that since the pieces of the coordinate data of other vertexes (vertex 2-4) each have basically identical structure with the piece of the coordinate data 310 of the vertex 1, a description thereof is omitted.

Described as above, the pieces of the coordinate data of the vertexes and the three-dimensional coordinate values of the vertexes are both contiguously stored in the contiguous area on the memory 110. The coordinate data read unit 102 of the input assembler unit 101 can continually read the pieces of the coordinate data of the vertexes from the memory 110 into the internal storage unit 106. Accordingly, compared with a case where pieces of the coordinate data are non-contiguously stored, efficiency of reading the pieces of the coordinate data can be improved. In addition, according to a width of the bus connecting the image processing device 100 and the memory 110, the coordinate data read unit 102 can read a plurality of the pieces of the coordinate data of the vertexes at one time. In such a case, the pieces of the coordinate data are exclusively read. As a result, compared with the case in which the pieces of the coordinate data are non-contiguously stored, efficiency of reading the pieces of the coordinate data can be improved.

Described as above, the coordinate data 300 is composed of pieces of the coordinate data each expressing a vertex in a local coordinate system. Note that since each of the transformed pieces of the coordinate data of the vertexes stored in the internal storage unit 106 by the coordinate transformation unit 103 of the input assembler unit 101 has basically identical structure with the piece of the coordinate data, a description thereof is omitted.

<Attribute Data>

Subsequently, the attribute data defining the vertexes stored in the memory 110 is described.

Figure 4:
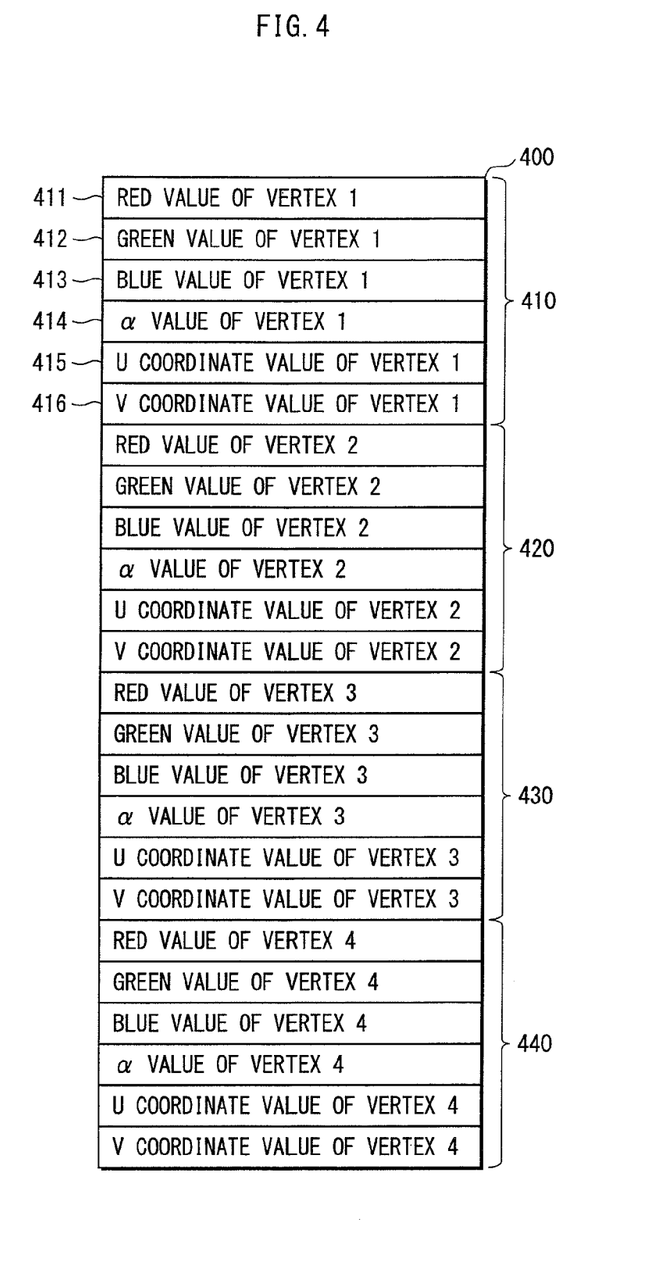
FIG. 4 is a view to show a data structure of attribute data 400 and a content example thereof.

FIG. 4 is a view to show a data structure of attribute data 400 and a content example thereof.

The attribute data 400 is data defining vertexes of the polygons that compose the three-dimensional object. FIG. 4 shows that, when the polygons that compose the three-dimensional object include the vertexes 1-4, the attribute data 400 is composed of a piece of the attribute data 410 defining the vertex 1, a piece of the attribute data 420 defining the vertex 2, a piece of the attribute data 430 defining the vertex 3 and a piece of the attribute data 440 defining the vertex 4. The pieces of the attribute data of the vertexes are contiguously stored in the contiguous area on the memory 110.

The piece of the attribute data 410 of the vertex 1 is composed of a Red value 411 of the vertex 1, a Green value 412 of the vertex 1, a Blue value 413 of the vertex 1, an α value 414 of the vertex 1, a U coordinate value 415 of the vertex 1, and a V coordinate value 416 of the vertex 1.

Herein, the Red value 411 of the vertex 1, the Green value 412 of the vertex 1, the Blue value 413 of the vertex 1 are values showing the color of the vertex 1 when the vertex 1 is expressed in the light three primary colors of red, green and blue. The α value 414 of the vertex 1 shows a transmittance that indicates a level of light transmitted from a light source with regard to the vertex 1. The U coordinate value 415 and the V coordinate value 416 of the vertex 1 are each a texture coordinate value on a texture related to the vertex 1 when the texture represented by a coordinate system peculiar to two dimensions (UV coordinate system) is pasted to a surface of the three-dimensional object. These data pieces are contiguously stored in the contiguous area on the memory 110. Note that since the pieces of the attribute data of other vertexes (vertexes 2-4) each have a basically identical structure with the piece of the attribute data 410 of the vertex 1, a description thereof is omitted.

<Display List>

Subsequently, a description is made on the display list.

Figure 5:
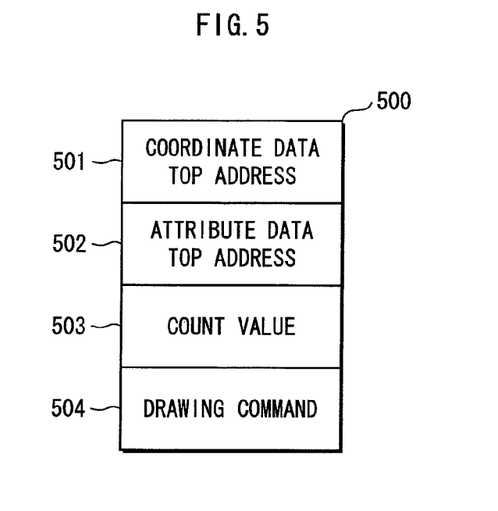
FIG. 5 is a view to show a data structure of a display list 500.

FIG. 5 is a view to show a data structure of a display list 500.

As shown in FIG. 5, the display list 500 is composed of a coordinate data top address 501, an attribute data top address 502, a count value 503, and a drawing command 504.

The coordinate data top address 501 is a top address value of an area on the memory 110 which contiguously stores the pieces of the coordinate data defining the vertexes of the polygons composing the three-dimensional object. More specifically, the coordinate data top address 501 is a top address value of an area storing therein the X coordinate value 311 of the vertex 1 of the coordinate data 300 shown in FIG. 3.

The attribute data top address 502 is a top address value of an area on the memory 110 which contiguously stores the pieces of the coordinate data defining the vertexes of the polygons composing the three-dimensional object. More specifically, the coordinate data top address 502 is a top address value of an area storing therein the Red value 411 of the vertex 1 of the attribute data 400 shown in FIG. 4.

The count value 503 is data showing the number of the polygons composing the three-dimensional object. The number of the polygons shown by the count value 503 plus two equals to the number of the vertexes of the three-dimensional object. Thus, according to the count value 503, the coordinate data read unit 102 can read, from the address value on the memory 110 shown by the coordinate data top address 501, the identical number of pieces of the coordinate data with the number of the vertexes.

The drawing command 504 is a command for the display control unit 107 of the image processing device 100 to make the object drawn on the display device 130, using the transformed pieces of the coordinate data and the pieces of the attribute data stored in the internal storage unit 106 of the input assembler unit 101. For example, "Draw Arrays" is such a drawing command that is in conformity with Open GL (Open Graphics Library). The "Draw Arrays" command enables the number of the polygons shown by the count value 503 to be drawn with the use of the transformed pieces of the coordinate data and the pieces of the attribute data.

<Operation>

Figure 6:
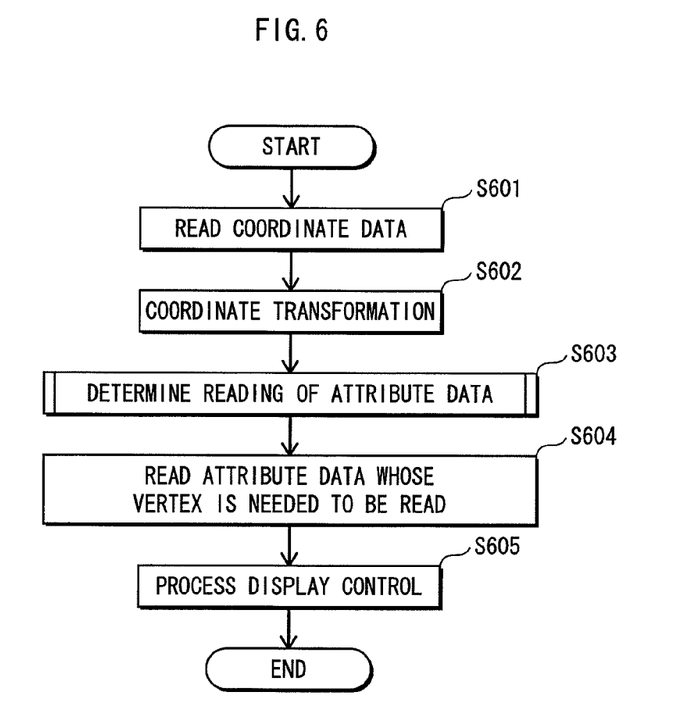
FIG. 6 is a flowchart to show processing by the image processing device 100 for displaying a three-dimensional object.
Figure 7:
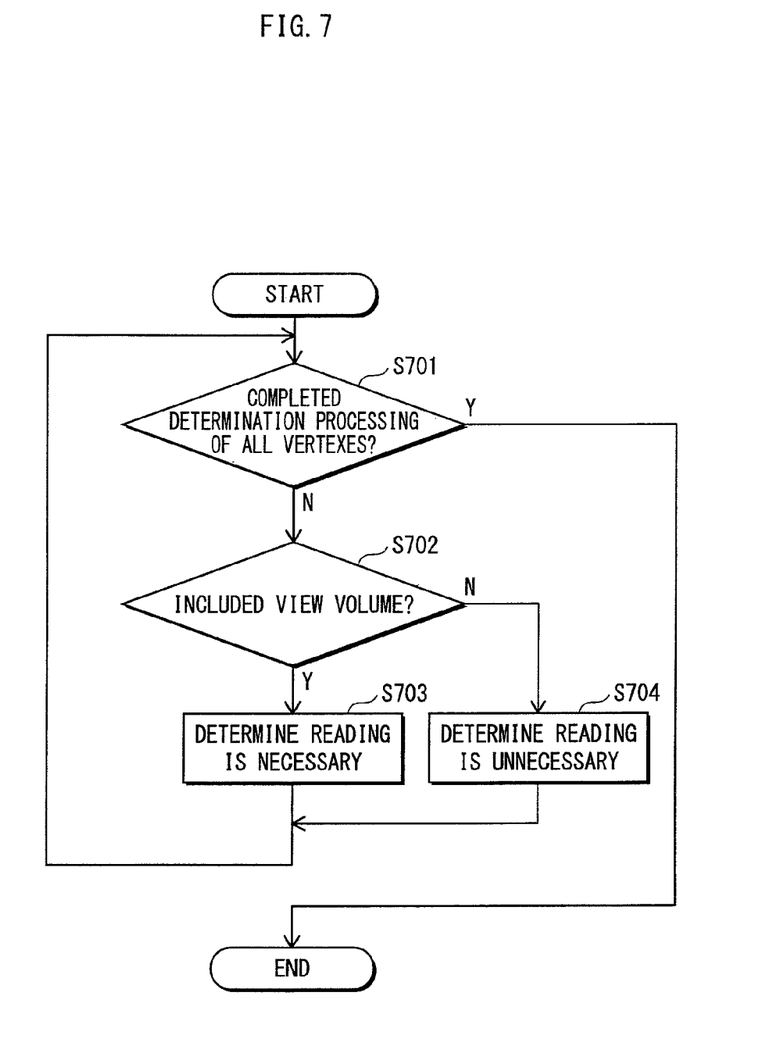
FIG. 7 is a flowchart to show determination processing by a vertex deletion unit 104.

The following describes the operation of the image processing device 100 having the above features and manipulating the above data, with the reference to FIGS. 6 and 7.

Firstly, FIG. 6 is a flowchart showing processing by the image processing device 100 for displaying the three-dimensional object.

The coordinate data read unit 102 of the input assembler unit 101 in the image processing device 100 reads, based on the coordinate data top address 501 and the count value 503 of the display list 500 received from the control device 120, the pieces of the coordinate data of the vertexes of the polygons composing the three-dimensional object from the memory 110 into the internal storage unit 106 of the input assembler unit 101 (Step S601).

The coordinate transformation unit 103 of the input assembler unit 101 performs coordinate transformation so that each piece of the coordinate data expressed in the local coordinate system of the vertex stored in the internal storage unit 106 is expressed in the world coordinate system, and stores the transformed piece of the coordinate data into the internal storage unit 106 (Step S602).

The vertex deletion unit 104 of the input assembler unit 101 determines whether the piece of the attribute data of each vertex needs to be read based on the transformed piece of the coordinate data of the vertex stored in the internal storage unit 106 by the coordinate transformation unit 103, and stores the determination results into the internal storage unit 106 (Step S603).

The attribute data read unit 105 of the input assembler unit 101 reads, from the memory 110 into the internal storage unit 106, the piece of the attribute data of each vertex that is determined to be read, based on the determination results stored in the internal storage unit 106 and the top address value of the storage area of the piece of the attribute data on the memory 110 included in the display list (Step S604).

Based on the determination results, the transformed piece of the coordinate data and the piece of the attribute data of each vertex, the display control unit 107 of the image processing device 100 performs drawing processing to display part or a whole of each polygon included in the view volume on the display device 130 (Step S605).

Subsequently, a description is made on determination processing by the vertex deletion unit 104 (Step S603), with the reference to FIG. 7.

FIG. 7 is a flowchart showing the determination processing by the vertex deletion unit 104.

When the vertex deletion unit 104 has not completed the determination processing of all the vertexes (Step S701:N), the vertex deletion unit 104 determines whether at least part of one or more polygons having the vertexes each of which is the object to be determined is included in the view volume (Step S702).

When at least part of the polygon having the vertexes is included in the view volume (Step S702:Y), the vertex deletion unit 104 determines that it is necessary to read the piece of the attribute data of each vertex to be determined, and stores the determination results in the internal storage unit 106 (Step S703).

When no part of the polygon having the vertex to be determined is included in the view volume (Step S702:N), the vertex deletion unit 104 determines that it is unnecessary to read the piece of the attribute data of each vertex to be determined, and stores the determination results in the internal storage unit 106 (Step S704).

After performing the determination in Step S703 or S704, the vertex deletion unit 104 returns to Step S701, and when the determination processing of all the vertexes is completed (Step S701:Y), the vertex deletion unit 104 completes the determination processing.

Note that the determination result is not only capable of identifying whether it is necessary to read the piece of the attribute data of each vertex that is the target to be determined, but also capable of identifying whether each vertex to be determined is included in the view volume when it is determined that it is necessary to read the piece of the attribute data of the vertex to be determined. For example, in order that the view volume includes the vertex to be determined, when it is determined it is necessary to read the piece of the attribute data of the vertex to be determined, "1" is recorded as the determination result. When the vertex to be determined is not included in the view volume but when a polygon including the vertex to be determined is included in the view volume, and therefore when it is determined that it is necessary to read the piece of the attribute data of the vertex to be determined, "2" is recorded as the determination result. When it is determined that it is unnecessary to read the piece of the attribute data of the vertex to be determined, "0" is recorded as the determination result.

<Specific Example>

The following specifically describes the operation of the image processing device 100 with the reference to respective flowcharts shown in FIGS. 6 and 7 with the use of examples shown in the figures.

Figure 8:
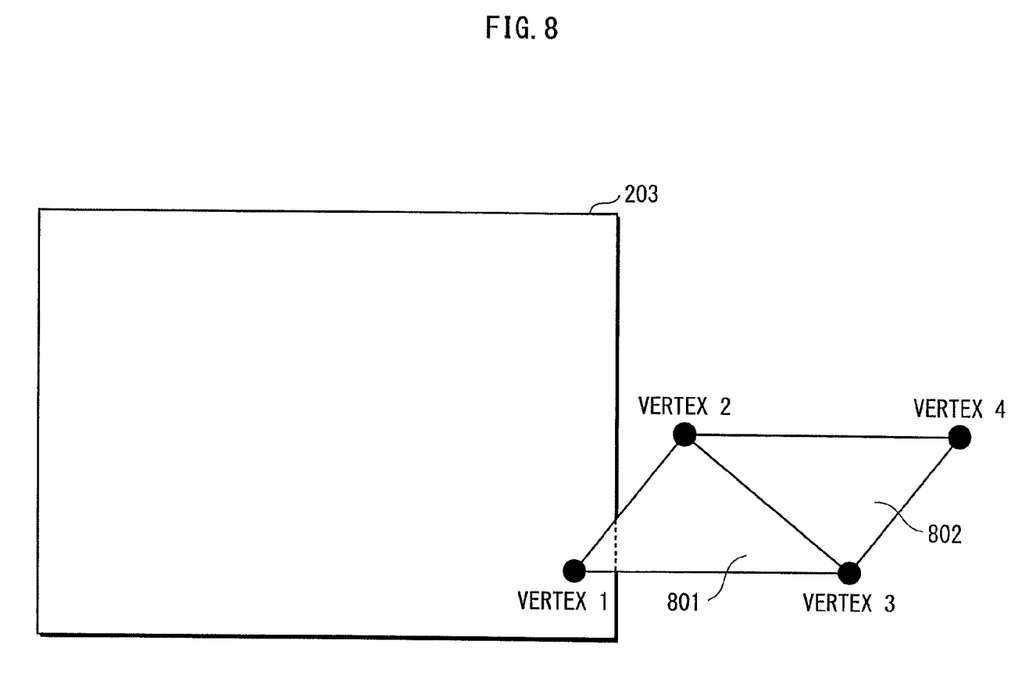
FIG. 8 is a view to specifically explain an operation of the image processing device 100.

FIG. 8 is a view to specifically explain the operation of the image processing device 10. FIG. 8 shows the following example. Polygons 801 and 802 compose a three-dimensional object, and the view volume includes part of the polygon 801 and does not include any part of the polygon 802 when seen in a view direction from the view point. Note that the part of the polygon 801 included in the view volume includes the vertex 1 but not the vertex 2 or 3.

Based on the coordinate data top address 501 and the count value 503 of the display list 500 received from the control device 120, the coordinate data read unit 102 of the input assembler unit 101 in the image processing device 100 reads the pieces of the coordinate data of the vertexes (vertexes 1-4) of the polygons composing the three-dimensional object from the memory 110 into the internal storage unit 106 of the input assembler unit 101 (Step S601 in FIG. 6).

The coordinate transformation unit 103 of the input assembler unit 101 performs coordinate transformation on the pieces of the coordinate data of the vertexes (vertexes 1-4) stored in the internal storage unit 106 to be expressed in the world coordinate system. After the coordinate transformation, the transformed pieces of the coordinate data are stored in the internal storage unit 106 (Step S602).

The vertex deletion unit 104 of the input assembler unit 101 determines whether it is necessary to read the pieces of the attribute data of the vertexes based on the transformed pieces of the coordinate data of the vertexes (vertexes 1-4) stored in the internal storage unit 106 by the coordinate transformation unit 103, and stores the determination results in the internal storage unit 106 (Step S603).

More specifically, since the determination processing of all the vertexes is not completed (Step S701:N in FIG. 7), initially, the vertex deletion unit 104 performs the determination processing on the vertex 1. Since the coordinates expressed by the piece of the coordinate data of the vertex 1 are included in the view volume (Step S702:Y), it is determined that it is necessary to read the piece of the attribute data of the vertex 1, and for example, "1" is stored in the internal storage unit 106 as the determination result (Step S703).

Subsequently, since the determination processing on all the vertexes is not completed (Step S701:N), the vertex deletion unit 104 performs the determination processing on the vertex 2. Since the view volume includes part of the polygon 801 having the vertex 2, the vertex deletion unit 104 determines it is necessary to read the piece of the attribute data of the vertex 2, and for example, "2" is stored in the internal storage unit 106 as the determination result (Step S703).

Subsequently, since the determination processing on all the vertexes is not completed (Step S701:N), the vertex deletion unit 104 performs the determination processing on the vertex 3. Since the view volume includes part of the polygon 801 having the vertex 3, the vertex deletion unit 104 determines it is necessary to read the piece of the attribute data of the vertex 2, and for example, "2" is stored in the internal storage unit 106 as the determination result (Step S703).

Subsequently, since the determination processing on all the vertexes is not completed (Step S701: N), the vertex deletion unit 104 performs the determination processing on the vertex 4. Since no part of the polygon 802 having the vertex 4 is included in the view volume (Step S702:N), the vertex deletion unit 104 determines it is unnecessary to read the piece of the attribute data of the vertex 4, and for example, "0" is stored in the internal storage unit 106 as the determination result (Step S704). The vertex deletion unit 104 completes the determination processing on all the vertexes (Step S701:Y), and thus, the vertex deletion unit 104 completes the determination processing.

Based on the determination results stored in the internal storage unit 106 and the top address value of the storage area of the piece of the attribute data on the memory 110 included in the display list, the attribute data read unit 105 of the input assembler unit 101 reads, from the memory 110 into the internal storage unit 106, the piece of the attribute data of each vertex (vertexes 1-3) that is determined to require being read (Step S604 in FIG. 6).

Based on the determination results, the transformed pieces of the coordinate data and the pieces of the attribute data of the vertexes, the display control unit 107 of the display processing device 100 performs drawing processing so that part of the polygon 801 included in the view volume is displayed on the display device 130 (Step S605).

Described as above, the attribute data read unit 105 of the input assembler unit 101 reads the pieces of the attribute data of the vertexes 1-3 from the memory 110 but does not read the piece of the attribute data of the vertex 4. Thus, compared with the case where the pieces of the attribute data of the vertexes 1-4 are unconditionally read from the memory 110, the image processing can be achieved at higher speed according to the present invention.

<Supplement>

Described as above, the image processing device pertaining to the present invention is described based on the embodiment. However, the image processing device may be modified as follows. The present invention is never limited to the image processing device as shown in the embodiment.

(1) In the embodiment, the description is made that the image processing device 100 performs image processing on a three-dimensional object composed of a plurality of polygons. However, the image processing may be performed on a two-dimensional object or a three-dimensional object composed of not only polygons but also points and line segments.

(2) In the embodiment, the description is made as follows. The coordinate transformation unit 103 performs coordinate transformation on the pieces of the coordinate data so that each vertex expressed in the local coordinate system is expressed in the world coordinate system. However, coordinate transformation may be performed on each piece of the coordinate data to be expressed in a display coordinate system that is a two-dimensional coordinate system for being displayed on a display. In this case, the vertex deletion unit 104 determines whether it is necessary to read the piece of the attribute data of each vertex based on whether at least part of each polygon is included in a view port which is a two-dimensional display area, instead of whether at least part of each polygon is included in the view volume.

(3) In the embodiment, the description is made on the example in which the vertexes contained in the polygons composing the three-dimensional object are identified according to the storing order of the pieces of the coordinate data of the vertexes in the coordinate data 300. However, for example, for every vertex, data showing that the polygon including the vertex may be added to the coordinate data 300. In addition to the coordinate data 300, data defining vertexes included in every polygon may be stored.

In the embodiment, the description is made as follows. The coordinate data 300 is composed of four pieces of the coordinate data respectively defining the vertexes 1-4. The vertexes 1-3 compose one polygon, and the vertexes 2-4 compose another polygon. That is to say, the pieces of the coordinate data of the vertexes 2 and 3 shared by the two polygons are not redundantly registered in the coordinate data 300. However, by registering all the three vertexes for each polygon in the coordinate data 300, the vertexes composing the polygon may be identified. For example, as with the embodiment, when the vertexes 1-3 compose one polygon, and when the vertexes 2-4 compose another polygon, the pieces of the coordinate data may be registered in the order of the vertexes 1, 2, 3, 2, 3 and 4 in the coordinate data 300. Thus, by changing the data structure of the coordinate data 300, the image processing device can perform image processing on an object composed of a plurality of polygons that do not share mutual vertexes.

(4) The description is made as follow. The attribute data read unit 105 according to the embodiment reads all the pieces of the attribute data of the vertexes of the polygon when at least part of the polygon is included in the view volume. However, the pieces of the attribute data may be read step by step. More specifically, α value (transmittance) of each vertex of the polygon may be read first. When the α values of all the vertexes of the polygon is 0%, which is to say, when the polygon permits no light to pass, the attribute data read unit 105 may read the colors (Red value, Green value, Blue value) and the texture coordinates (U coordinate value, V coordinate value) of only a polygon other than polygons hidden behind the polygon. Thus, since the attribute data unit 105 does not read the colors and texture coordinates of the other polygon than the polygons hidden behind the polygon permitting no light to pass when the polygon is seen in a view direction from the view point, image processing can be realized at higher speed according to the present invention.

(5) In the embodiment, an example of a data structure of the piece of the coordinate data of each vertex in the coordinate data 300 is shown. However, the present invention is not limited to this. For example, the present invention may include a reduction percentage W of the depth associated with each vertex.

(6) In the embodiment, an example of a data structure of the piece of the coordinate data of each vertex in the attribute data 400 is shown. However, the present invention is not limited to this. For example, when there are a plurality of textures corresponding to the vertexes, a plurality of texture coordinates (U coordinate value and V coordinate value) may be included in the attribute data 400. In addition, a vertex normal vector (X component value, Y component value, Z component value) indicating a direction of the vertex may be included.

[Industrial Applicability]

The image processing device according to the present invention is used for image processing to display an object.

The invention claimed is:

1. An image processing system for displaying, in a predetermined display area, an object containing a plurality of points based on object data with use of computer graphics, each of the points being a point in a three-dimensional space, the image processing system device comprising:
   an external memory storing the object data, the object data including three-dimensional coordinate data and attribute data, both the three-dimensional coordinate data and the attribute data defining the points; and
   an image processing device including:
      an internal storage unit;
      a coordinate data read unit operable to read, from the external memory into the internal storage unit, a piece of the three-dimensional coordinate data of each point, without reading a piece of the attribute data of each point;
      a determination unit operable, for each point, to judge whether or not three-dimensional coordinates of the point defined in a piece of the three-dimensional coordinate data of the point are included in a predetermined display coordinate range that defines a range of three-dimensional coordinates to be displayed in the predetermined display area;
      an attribute data read unit operable (i) to read, into the internal storage unit, the piece of the attribute data of each point for which the three-dimensional coordinates are judged by the determination unit as being included in the predetermined display coordinate range, (ii) not to read, into the internal storage unit, the piece of the attribute data of each point for which the three-dimensional coordinates are judged by the determination unit as not being included in the predetermined display coordinate range; and
      a display control unit operable to have at least part of the object displayed in the predetermined display area, based on the pieces of the three-dimensional coordinate data and the attribute data read into the internal storage unit.

2. The image processing system of claim 1, wherein
   the object is composed of one or more polygons,
   the points are vertexes contained in each polygon,
   a piece of the three-dimensional coordinate data of each vertex is structured, so as to identify other vertexes of the polygon which includes the vertex,
   the determination unit determines, for each vertex, that a piece of the attribute data of the vertex does not need to be read if the polygon defined by the vertex and the other vertexes is entirely out of the predetermined display coordinate range, and
   the display control unit has at least part of each polygon displayed in the predetermined display area, based on the pieces of the three-dimensional coordinate data and the attribute data read into the internal storage unit.

3. The image processing system of claim 2, wherein the image processing device further includes:
   a coordinate transformation unit operable (i) to perform coordinate transformation on each piece of the three-dimensional coordinate data read into the internal storage unit by the coordinate data read unit so that coordinates of each piece of the three-dimensional coordinate data are expressed in a world coordinate system, and (ii) to read each transformed piece of the three-dimensional coordinate data into the internal storage unit, wherein
   the object is a three-dimensional object,
   the predetermined display coordinate range is a view volume,
   the determination unit determines, for each vertex, that a piece of the attribute data of the vertex does not need to be read if the polygon defined by the vertex and the other vertexes is entirely out of the view volume, the determination being made based on each transformed piece of the three-dimensional coordinate data, and
   the display control unit has at least part of each polygon displayed in the predetermined display area, based on the transformed pieces of the three-dimensional coordinate data and the pieces of the attribute data read into the internal storage unit.

4. The image processing system of claim 1, wherein pieces of the three-dimensional coordinate data composing the object data are contiguously stored in the external memory.

5. The image processing system of claim 1, wherein each piece of the attribute data includes color data.

6. The image processing system of claim 1, further comprising and a control device,
wherein the control device contiguously stores, in the external memory, pieces of the three-dimensional coordinate data each defining one point of the plurality of points of the object.

7. An image processing system for displaying, in a predetermined display area, an object containing a plurality of points based on object data with use of computer graphics, each of the points being a point in a three-dimensional space, the image processing system comprising:
an external memory storing the object data, the object data including three-dimensional coordinate data and attribute data, both the three-dimensional coordinate data and the attribute data defining the points; and
an image processing integrated circuit including:
an internal storage unit;
a coordinate data read unit operable to read, from the external memory into the internal storage unit, a piece of the three-dimensional coordinate data of each point, without reading a piece of the attribute data of each point;
a determination unit operable, for each point, to judge whether or not three-dimensional coordinates of the point defined in a piece of the three-dimensional coordinate data of the point are included in a predetermined display coordinate range that defines a range of three-dimensional coordinates to be displayed in the predetermined display area;
an attribute data read unit operable (i) to read, into the internal storage unit, the piece of the attribute data of each point for which the three-dimensional coordinates are judged by the determination unit as being included in the predetermined display coordinate range, and (ii) not to read, into the internal storage unit, the piece of the attribute data of each point for which the three-dimensional coordinates are judged by the determination unit as not being included in the predetermined display coordinate range; and
a display control unit operable to have at least part of the object displayed in the predetermined display area, based on the pieces of the three-dimensional coordinate data and the attribute data read into the internal storage unit.

8. An input assembler system for displaying, in a predetermined display area, an object containing a plurality of points based on object data with use of computer graphics, each of the points being a point in a three-dimensional space, the input assembler system comprising:
an external memory storing the object data, the object data including three-dimensional coordinate data and attribute data, both the three-dimensional coordinate data and the attribute data defining the points; and
an input assembler device including:
an internal storage unit;
a coordinate data read unit operable to read, from the external memory into the internal storage unit, a piece of the three-dimensional coordinate data of each point, without reading a piece of the attribute data of each point;
a determination unit operable, for each point, to judge whether or not three-dimensional coordinates of the point defined in a piece of the three-dimensional coordinate data of the point are included in a predetermined display coordinate range that defines a range of three-dimensional coordinates to be displayed in the predetermined display area;
an attribute data read unit operable (i) to read, into the internal storage unit, the piece of the attribute data of each point for which the three-dimensional coordinates are judged by the determination unit as being included in the predetermined display coordinate range, and (ii) not to read, into the internal storage unit, the piece of the attribute data of each point for which the three-dimensional coordinates are judged by the determination unit as not being included in the predetermined display coordinate range; and
a display control unit operable to have at least part of the object displayed in the predetermined display area, based on the pieces of the three-dimensional coordinate data and the attribute data read into the internal storage unit.

9. An input assembling system for displaying, in a predetermined display area, an object containing a plurality of points based on object data with use of computer graphics, each of the points being a point in a three-dimensional space, the input assembling system comprising:
an external memory storing the object data, the object data including three-dimensional coordinate data and attribute data, both the three-dimensional coordinate data and the attribute data defining the points; and
an input assembling integrated circuit including:
an internal storage unit;
a coordinate data read unit operable to read, from the external memory into the internal storage unit, a piece of the three-dimensional coordinate data of each point, without reading a piece of the attribute data of each point;
a determination unit operable, for each point, to judge whether or not three-dimensional coordinates of the point defined in a piece of the three-dimensional coordinate data of the point are included in a predetermined display coordinate range that defines a range of three-dimensional coordinates to be displayed in the predetermined display area;
an attribute data read unit operable (i) to read, into the internal storage unit, the piece of the attribute data of each point for which the three-dimensional coordinates are judged by the determination unit as being included in the predetermined display coordinate range, and (ii) not to read, into the internal storage unit, the piece of the attribute data of each point for which the three-dimensional coordinates are judged by the determination unit as not being included in the predetermined display coordinate range; and
a display control unit operable to have at least part of the object displayed in the predetermined display area, based on the pieces of the three-dimensional coordinate data and the attribute data read into the internal storage unit.

* * * * *